United States Patent
Yeh

(10) Patent No.: US 7,380,656 B2
(45) Date of Patent: Jun. 3, 2008

(54) OPTICAL DISC CAN STRUCTURE FOR DETERRING THEFT

(76) Inventor: Te-Shun Yeh, No. 16, Lin 14, Chieh Yung Li, Pa Te City, Tao Yuan Hsien (TW)

( * ) Notice: Subject to any disclaimer, the term of this patent is extended or adjusted under 35 U.S.C. 154(b) by 351 days.

(21) Appl. No.: 11/312,708

(22) Filed: Dec. 21, 2005

(65) Prior Publication Data

US 2006/0266664 A1    Nov. 30, 2006

(30) Foreign Application Priority Data

May 27, 2005    (TW) ............................... 94208799 U

(51) Int. Cl.
  *B65D 85/57*    (2006.01)
(52) U.S. Cl. .................. 206/303; 206/308.2; 206/445; 206/493
(58) Field of Classification Search ............ 206/308.1, 206/308.2, 303, 232, 493, 499, 307.1
See application file for complete search history.

(56) References Cited

U.S. PATENT DOCUMENTS 6,112,894 A *    9/2000    Kikuchi et al. .......... 206/308.1
6,820,741 B2 *   11/2004   Ferguson et al. ........... 206/310
6,880,697 B2 *    4/2005   Cheng ....................... 206/303
7,121,405 B2 *   10/2006   Ito et al. ................. 206/308.1

* cited by examiner

*Primary Examiner*—Jacob K. Ackun, Jr.
(74) *Attorney, Agent, or Firm*—Rosenberg, Klein & Lee

(57) ABSTRACT

An optical disc can structure for deterring theft includes a lower cover and an upper cover. The center of the lower cover has a positioning column. The edge of the lower cover extends outward to form a circular protruding edge. On the protruding edge there are wedging parts. Under the wedging parts there are wedging slots. On the wedging parts there are fixing pins. The lower end of the fixing pin plugs into the wedging slot. A receiving space is formed in the inner part of the upper cover. On the bottom of the external wall of the upper cover there are a plurality of wedging bodies. The wedging bodies have fixing holes. The upper cover covers the lower cover. The wedging bodies can be rotated and wedged into corresponding wedging slots and the lower ends of the fixing pins are located in the corresponding holes.

13 Claims, 4 Drawing Sheets

OPTICAL DISC CAN STRUCTURE FOR DETERRING THEFT

BACKGROUND OF THE INVENTION

1. Field of the Invention

The present invention relates to an optical disc can structure for deterring theft. In particular, this invention relates to a container for storing optical discs that successfully deters theft.

2. Description of the Related Art

Optical disc cans and optical disc boxes are used for storing optical discs. There are a wide variety of optical disc cans and optical disc boxes that are available on the market. Optical disc cans with a larger volume are obviously able to receive more optical discs.

Please refer to FIG. 1, which shows an optical disc can of the prior art. The optical disc can 8 includes a lower cover 81 and an upper cover 82. The lower cover 81 is a circular disc for receiving optical discs, such as CDs, LDs, VCDs and DVDs, etc. In the center of the lower cover 81 there is a positioning column 811 that is hollow and is formed into one piece with the lower cover 81. The positioning column 811 has an appropriate height for extending the positioning column 811 into the inner of the upper cover 82. The center hole of the optical disc is located at the positioning column and the optical disc is positioned by the positioning column.

The upper cover 82 is hollow and has an opening at the bottom. A receiving space 821 is formed in the inner part of the upper cover 82 for receiving optical discs. There are a plurality of wedging flakes 822 that are located at the bottom of the upper cover 82 and protrude horizontally. The edge of the lower cover 81 extends outward to form a circular protruding edge 812. The external diameter of the circular protruding edge 812 of the lower cover is larger than the external diameter of the upper cover 82. Therefore, the circular protruding edge 812 protrudes from the external edge of the upper cover 82. The circular protruding edge 812 has a plurality of wedging slots 813 that corresponds to the wedging flakes 822.

When the upper cover 82 covers the lower cover 81, the wedging flakes 822 are wedged into the corresponding wedging slots 813 by rotating the lower cover 81 and the upper cover 82 with an opposite direction. Thereby, the upper cover 82 is firmly wedged with the lower cover 81.

However, when the optical disc can 8 and the optical discs received in the optical disc can 8 are sold in a shop, a thief can easily rotate the upper cover 82 and the lower cover 81 to separate the upper cover 82 from the lower cover 81 and steal the optical discs in the optical disc can 8. The design though convenient for users is a poor deterrent to those looking to steal. Even when the seller encloses a thin film 9 on the outside of the optical disc can 8, the burglar also easily cut through the thin film 9 to gain access to the optical discs.

SUMMARY OF THE INVENTION

One particular aspect of the present invention is to provide an optical disc can structure that deters theft. The optical disc can structure of the present invention locks the can. A burglar cannot rotate the upper cover and the lower cover to separate the upper cover from the lower cover and steal the optical discs in the optical disc can 8. It deters theft of the optical discs.

Another particular aspect of the present invention is to provide an optical disc can structure for deterring theft. After the optical disc can is unsealed and opened, a fixing pin is destroyed forever and cannot be recovered. Therefore, everyone knows that the optical disc can has been unsealed. It prevents the optical disc can from being opened and prevents the optical discs from being stolen without being discovered. It deters theft very well.

The optical disc can structure for deterring theft includes a lower cover and an upper cover. The lower cover has a positioning column located at the center of the lower cover. The edge of the lower cover extends outward to form a circular protruding edge. On the protruding edge there is a plurality of wedging parts and the wedging parts are disposed with a space separating each other. Under the wedging parts individually there is a wedging slot. On the wedging parts there are fixing pins that can be separated from the wedging parts. The lower end of the fixing pin is plugged into the wedging slot located under wedging part. A receiving space is formed in the inner part of the upper cover. On the bottom of the external wall of the upper cover there are a plurality of wedging bodies. The wedging bodies have fixing holes corresponding to the fixing pins. The upper cover covers the lower cover. The wedging bodies are rotated and wedged into the corresponding wedging slot and the lower ends of the fixing pins are located in the corresponding holes.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
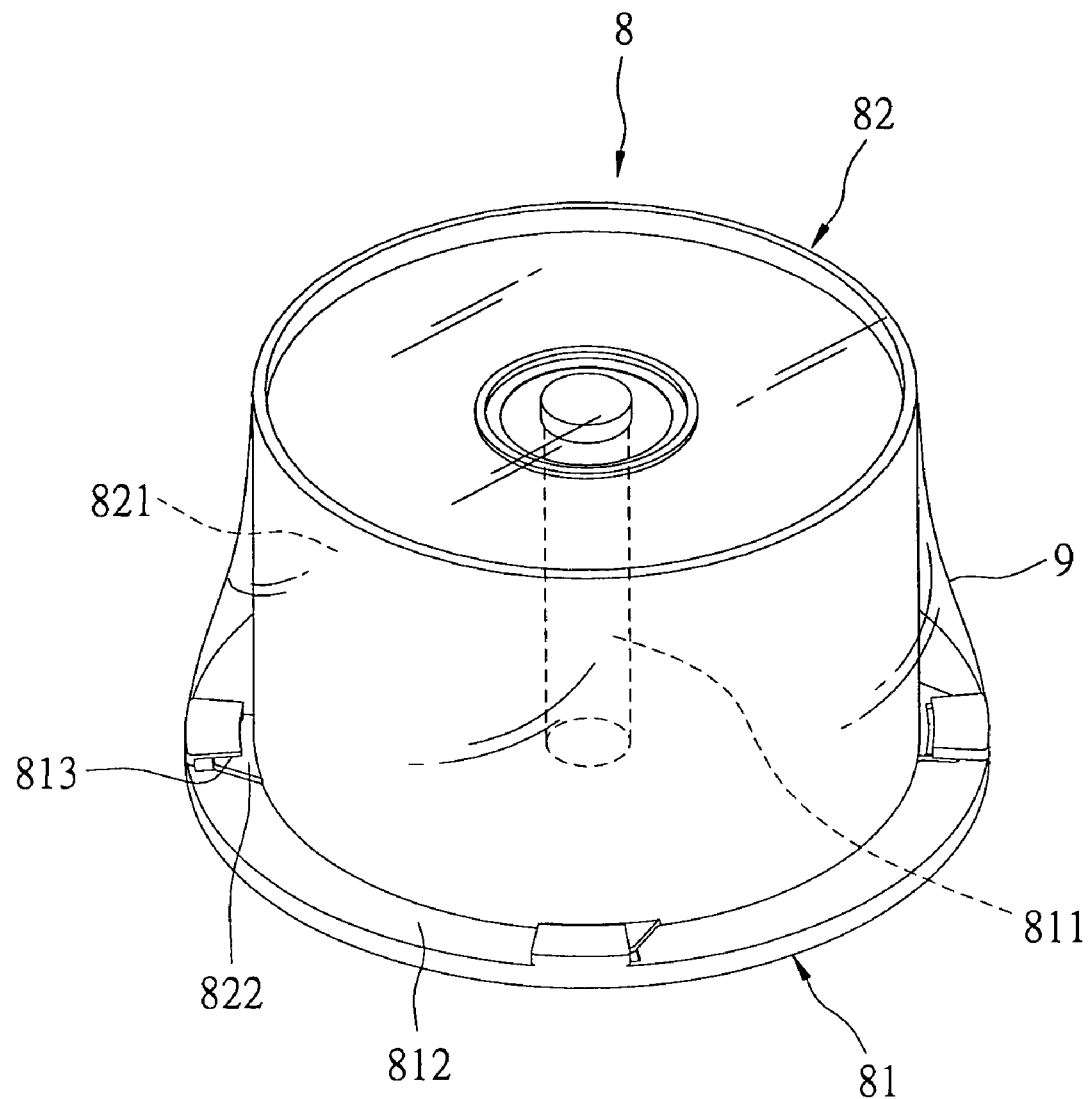
FIG. 1 is a perspective view of the optical disc can of the prior art.
Figure 2:
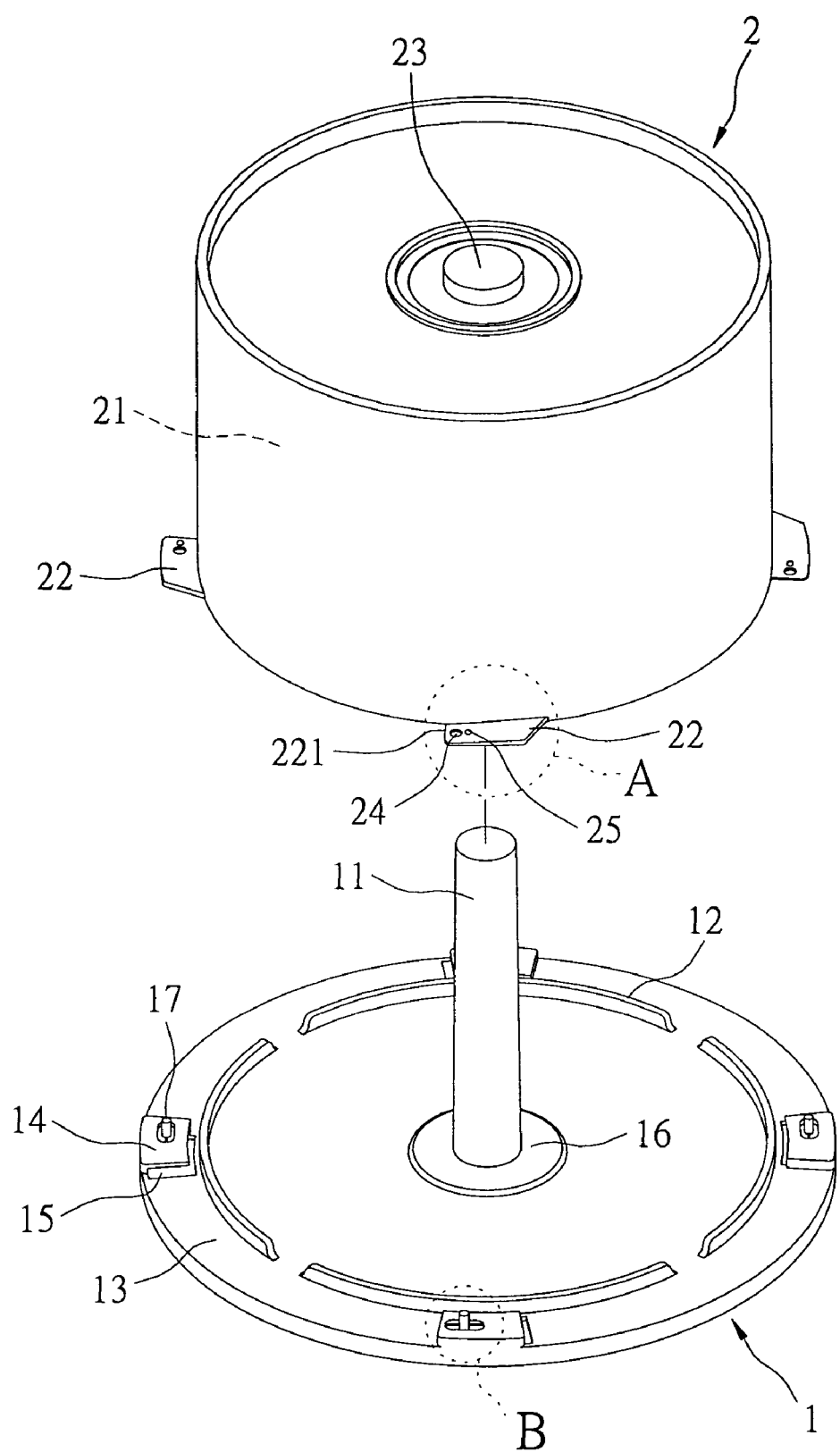
FIG. 2 is an exploded perspective view of the optical disc can of present invention.
Figure 3:
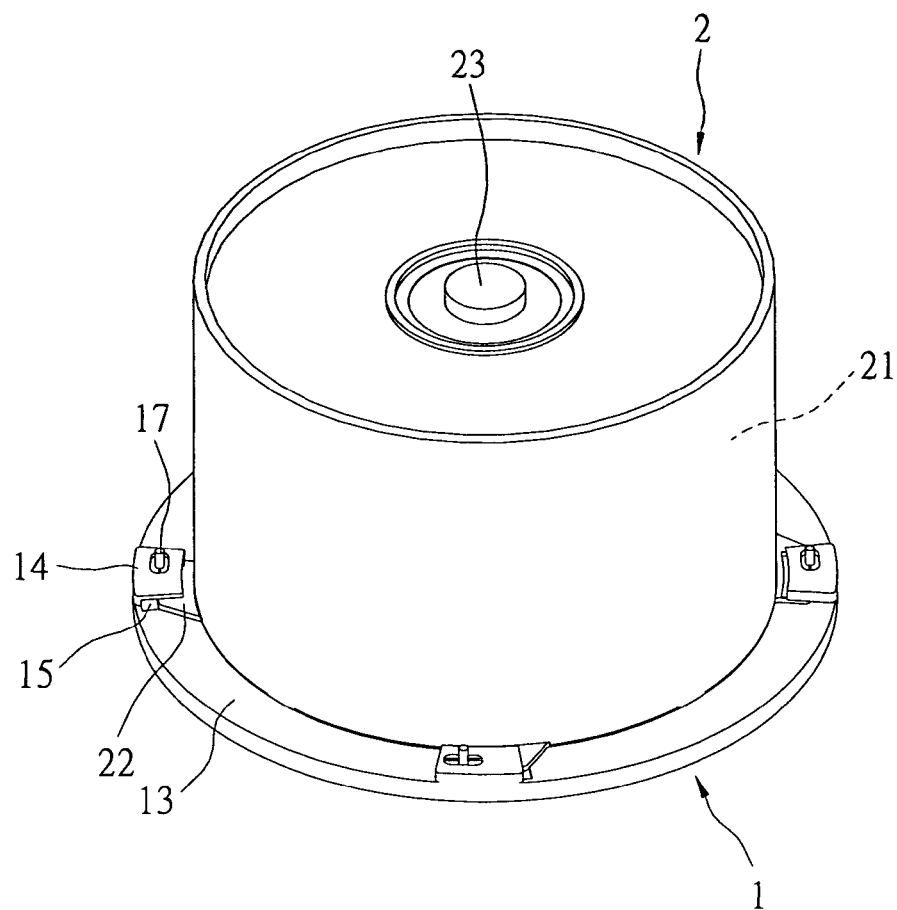
FIG. 3 is a perspective view of the optical disc can of present invention.
Figure 4:
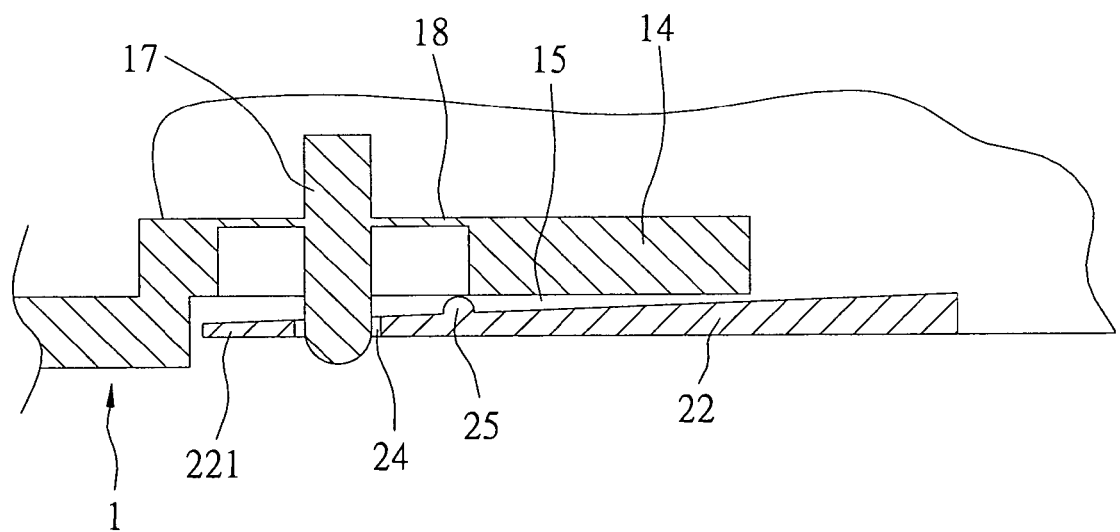
FIG. 4 is a cross-sectional view of the optical disc can of present invention.

Please refer to FIGS. 2, 3 and 4. The present invention provides an optical disc can structure for deterring theft. In particular, this invention relates to a container for storing a lot of optical discs. The optical disc can includes a lower cover 1 and an upper cover 2. The lower cover 1 is made of a plastic material and it is circular. The top of the lower cover 1 receives optical discs (such as CDs, LDs, VCDs or DVDs etc.). The shape of the lower cover 1 is not limited to the above description and it can be modified according to the type of disc. On the center of the lower cover 1 there is a positioning column 11 that is integrally made. The positioning column 11 is vertically located on the top of the lower cover 1. The positioning column 11 can be a hollow column or is composed by a plurality of rib flakes. The positioning column 11 has an appropriate height for extending into the inner of the upper cover 2. The center hole of the optical disc is located at the positioning column 11 and the optical disc is positioned by the positioning column 11. The height of the positioning column 11 can be modified according to the upper cover 2. When the height of the upper cover 2 is increased, the height of the positioning column 11 is also increased. When the height of the upper cover 2 is decreased, the height of the positioning column 11 is also decreased.

The lower cover 1 has a blocking board 12 that surrounds the lower cover 1 and is circular shaped. The blocking board 12 surrounds the lower cover 1 continuously or discontinuously. In this embodiment, the blocking board 12 surrounds the lower cover 1 discontinuously. The blocking board 12 is located on the top of the lower cover 1 and is near the edge of the lower cover 1. The blocking board 12 is used for wedging the open edge of the bottom of the upper cover 2. Therefore, the upper cover is positioned on the lower cover 1.

The edge of the lower cover 1 extends outward to form a circular protruding edge 13. The protruding edge 13 is located on the outside of the blocking board 12. The external diameter of the protruding edge 13 of the lower cover 1 is larger than the external diameter of the upper cover 2. Therefore, the protruding edge 13 protrudes from the external edge of the upper cover 2. On the protruding edge 13 there is a plurality of wedging parts 14 and the wedging parts 14 are disposed with a space to each other. The wedging parts 14 are board bodies that are located on the top of the protruding edge 13 with an appropriate height. Under the wedging parts 14 individually there is a wedging slot 15. The wedging slot 15 fits with a wedging body 22 of the upper cover 2. The wedging body 22 and the wedging slot 15 form a wedging structure.

On the lower cover 1 there is a separating body 16 that is circular-board shaped and is integrally formed with the lower cover 1. The diameter of the separating body 16 is larger than the diameter of the positioning column 11. The separating body 16 is located on the top of the lower cover 1 and is located at the outside of the positioning column 11 with a proper distance for lifting the optical discs. The separating body 16 is used for supporting the optical discs with a proper height. The separating body 16 prevents the lowest optical disc from contacting the top of the lower cover 1 directly. So that, the optical discs don't suffer from the problem of the lower cover 1 scratching the optical discs.

The upper cover 2 is made of a plastic material and has a hollow circular body. The bottom of the upper cover 2 is open. The height of the upper cover 2 can be modified according to a manufacturer's requirements. When the quantity of the optical discs received by the upper cover 2 is increased, the height of the upper cover 2 is increased. If the quantity of the optical discs received by the upper cover 2 is decreased, the height of the upper cover 2 is decreased. A receiving space 21 is formed in the inner part of the upper cover 2 for receiving a plurality of optical discs. On the bottom of the external wall of the upper cover 2 there are a plurality of wedging bodies 22. The wedging bodies 22 correspond to the wedging slot 15 and each wedging body 22 has a protruding point 25. The protruding point 25 protrudes to the top of the wedging body 22 with a little height for enhancing the wedging strength of the wedging body 22 and the wedging slot 15. On the upper cover 2 there is a concave slot 23. The concave slot 23 is located at the center of the top of the upper cover 2 and corresponds to the upper end of the positioning column 11.

When the upper cover 2 covers the lower cover 1, the opening of the bottom of upper cover 2 is wedged and connected to the outside of the blocking board 12 and the upper end of the positioning column 11 of the lower cover 1 is plugged into the concave slot 23 located on the top of the upper cover 2. By rotating the lower cover 1 and the upper cover 2 in an opposite direction, the wedging bodies 22 are rotated and wedged into the corresponding wedging slot 15. The wedging bodies 22 and the wedging slots 15 form a wedging structure to make the upper cover 2 fasten with the lower cover 1 securely (as shown in FIG. 3). The protruding point 25 located on the wedging bodies 22 touches the inner wall of the wedging slot 15 to enhance the wedging strength of the wedging body 22 and wedging slot 15.

Figure 2A:
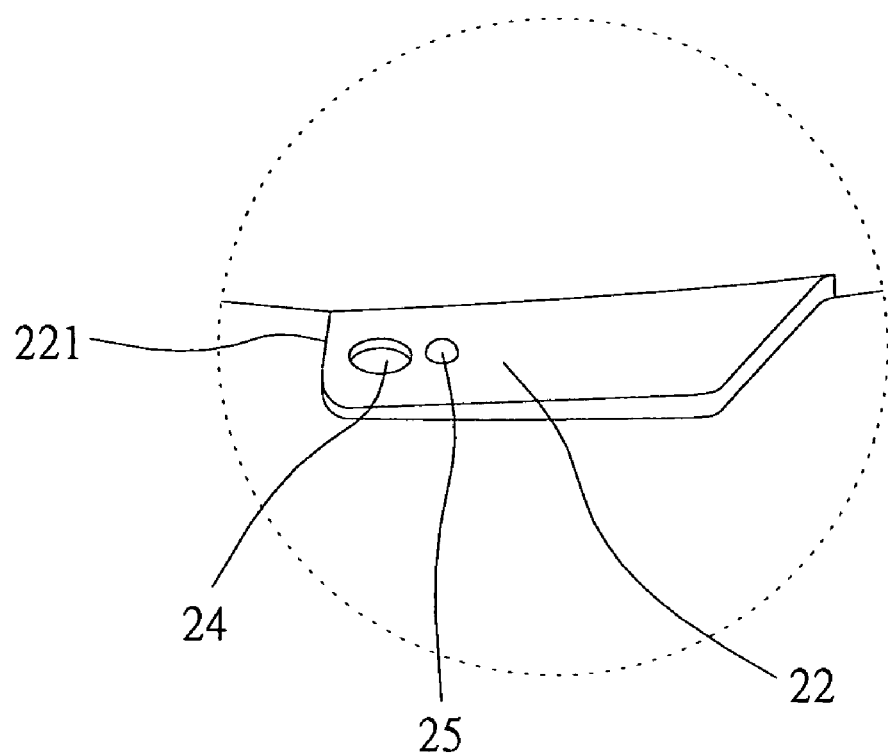
FIG. 2A is a detailed view of a part A in the FIG. 2.
Figure 2B:
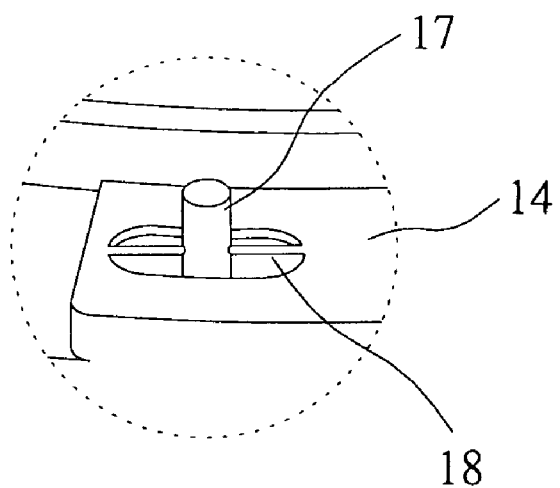
FIG. 2B is a detailed view of a part B in the FIG. 2.

On the wedging part 14 of the lower cover 1, a fixing pin 17 is formed that is integrally made with the lower cover 1 (as shown in FIGS. 2B and 4). The fixing pin 17 is a column that is erected on the wedging part 17. The fixing pin 17 is connected with the wedging part 14 via two or more than two connecting parts 18. The fixing pin 17 protrudes to the top of the wedging part 14 with a proper height for unplugging the fixing pin 17 easily from the top. The lower end of the fixing pin 17 is plugged into the wedging slot 15 located under the wedging part 14. The lower end of the fixing pin 17 has an arc shape.

Each wedging body 22 of the upper cover 2 has a fixing hole 24 corresponding to the fixing pin 14 (as shown in the FIGS. 2A and 4.). The thickness of the front part 221 of the wedging body 22 wedged into the wedging slot 15 is thin for guiding the lower end of the fixing pin 17 entering the fixing hole 24. Therefore, when the wedging bodies 22 are rotated and wedged into the corresponding wedging slots 15, the lower end of the fixing pin 17 is slipped into the fixing hole 24 along the top of the wedging body 22. Thereby, the upper cover 2 is locked with the lower cover 1.

When the upper cover 2 is fastened with the lower cover 1 by wedging the wedging body 22 with the wedging slot 15, it utilizes the fixing pin 17 located on the wedging part 14 of the lower cover 1 by slipping into the corresponding fixing hole 24 located on the wedging body 22 of the upper cover 2 to achieve the locking function. A thief cannot rotate the upper cover 2 and the lower cover 1 to separate the upper cover 2 from the lower cover 1 and steal the optical discs in the optical disc can.

When the optical disc can and the optical discs received in the optical disc can are unsealed and sold, the fixing pin 17 is unplugged from the top. Because the fixing pin is connected with the wedging part 14 via a separately connecting part 18, the fixing pin 17 can be unplugged and thrown via imposing a force on the fixing pin 17 to make the fixing pin 17 separate from the wedging part 14. Therefore, the fixing pin 17 is separated from the fixing hole 24. Thereby, the wedging bodies 22 are rotated and separated from the wedging slot 15 to make the upper cover 2 separate from the lower cover 1 and the optical discs in the optical disc can can be taken off.

After the optical disc can is unsealed and opened, a fixing pin 17 is destroyed forever and cannot be recovered. Therefore, everyone knows that the optical disc can has been unsealed. The optical disc can of the present invention prevents the optical disc can from being opened and prevents optical discs inside from being stolen without being discovered.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. An optical disc can structure for deterring theft, comprising:

a lower cover, having a positioning column located at the center of the lower cover, the edge of the lower cover extends outward to form a circular protruding edge, on the protruding edge there are a plurality of wedging parts and the wedging parts are disposed with a space to each other, under the wedging parts individually there is a wedging slot, on the wedging parts there are fixing pins that can be separated from the wedging parts, the lower end of the fixing pin is plugged into the wedging slots located under the wedging parts;

an upper cover, a receiving space is formed in the inner part of the upper cover, on the bottom of the external wall of the upper cover there are a plurality of wedging bodies, the wedging bodies have fixing holes corresponding to the fixing pins; and the upper cover covers the lower cover, the wedging bodies are rotated and wedged into the corresponding wedging slot and the lower ends of the fixing pins are located in the corresponding holes.

2. The optical disc can structure for deterring theft as claimed in claim 1, wherein the positioning column is vertically erected on the lower cover.

3. The optical disc can structure for deterring theft as claimed in claim 1, wherein the positioning column is a hollow column.

4. The optical disc can structure for deterring theft as claimed in claim 1, wherein the positioning column is composed of a plurality of rib flakes.

5. The optical disc can structure for deterring theft as claimed in claim 1, wherein the lower cover has a blocking board that surrounds the lower cover and is circular shaped, the blocking board is located on the top of the lower cover and is near the edge of the lower cover, the blocking board is used for wedging the open edge of the bottom of the upper cover.

6. The optical disc can structure for deterring theft as claimed in claim 1, wherein the wedging parts are a board body located at the top of the protruding edge with a proper height.

7. The optical disc can structure for deterring theft as claimed in claim 1, wherein on the lower cover there is a separating body that has a circular-board shape and is formed in one piece with the lower cover, the diameter of the separating body is larger than the diameter of the positioning column, and the separating body is located on the top of the lower cover and is located at the outside of the positioning column.

8. The optical disc can structure for deterring theft as claimed in claim 1, wherein on the upper cover there is a concave slot located at the center of the top of the upper cover, the upper end of the positioning column of the lower cover is plugged into the concave slot located on the top of the upper cover.

9. The optical disc can structure for deterring theft as claimed in claim 1, wherein the fixing pin is located at the wedging part and is integrally made with the wedging part.

10. The optical disc can structure for deterring theft as claimed in claim 1, wherein the fixing pin is a column erected on the wedging part, the fixing pin is connected with the wedging part via a connecting part.

11. The optical disc can structure for deterring theft as claimed in claim 1, wherein the upper end of the fixing pin protrudes to the top of the wedging part.

12. The optical disc can structure for deterring theft as claimed in claim 1, wherein the thickness of the front part of the wedging body is thin.

13. The optical disc can structure for deterring theft as claimed in claim 1, wherein each of the wedging bodies has a protruding point, the protruding point touches the inner wall of the wedging slot.

* * * * *